United States Patent
Barany et al.

(10) Patent No.: US 9,654,963 B2
(45) Date of Patent: May 16, 2017

(54) DYNAMIC ASSIGNMENT OF HOME AGENT AND HOME ADDRESS IN WIRELESS COMMUNICATIONS

(75) Inventors: Peter Anthony Barany, San Diego, CA (US); Ramin Rezaiifar, San Diego, CA (US); Paul E. Bender, San Diego, CA (US); Jun Wang, San Diego, CA (US); Sivaramakrishna Veerepalli, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 362 days.

(21) Appl. No.: 11/174,261

(22) Filed: Jun. 29, 2005

(65) Prior Publication Data

US 2006/0002356 A1  Jan. 5, 2006

Related U.S. Application Data

(60) Provisional application No. 60/585,532, filed on Jul. 1, 2004, provisional application No. 60/585,269, filed on Jul. 2, 2004.

(51) Int. Cl.
*H04W 8/06* (2009.01)
*H04W 8/26* (2009.01)
*H04W 12/06* (2009.01)
*H04W 80/04* (2009.01)

(52) U.S. Cl.
CPC ........... *H04W 8/06* (2013.01); *H04W 8/26* (2013.01); *H04W 12/06* (2013.01); *H04W 80/04* (2013.01)

(58) Field of Classification Search
USPC .................................. 370/338; 455/433
See application file for complete search history.

(56) References Cited

U.S. PATENT DOCUMENTS 6,434,134 B1 * 8/2002 La Porta et al. ............. 370/338
6,625,135 B1 * 9/2003 Johnson et al. ............. 370/332
6,804,720 B1 * 10/2004 Vilander et al. ............. 709/229
6,947,401 B2 * 9/2005 El-Malki et al. ............. 370/331
7,286,542 B2 * 10/2007 Tani ......................... 370/395.54

(Continued)

FOREIGN PATENT DOCUMENTS

EP  1009176  6/2000
EP  1 075 123 A  2/2001

(Continued)

OTHER PUBLICATIONS

Faccin et al., "Diameter Mobile IPv6 Application, draft-le-aaa-diameter-mobileipv6-03.tx," IETF Standard-Working-Draft, Internet Engineering Task Force, Apr. 2003, pp. 1-33.

(Continued)

*Primary Examiner* — Mazda Sabouri

(57) ABSTRACT

Embodiments disclosed herein relate to providing dynamic assignment of home agent and home address in wireless communications, such that a mobile node away from home may receive local access services from a visited network. In an embodiment, a mobile node accesses a visited network. The visited network authenticates the mobile node with its home network. The visited network then assigns a visited home agent and a home address for the mobile node. The mobile node subsequently performs secure binding with the visitor home agent. The mobile node proceeds with communications using the visitor home agent and home address.

36 Claims, 10 Drawing Sheets

(56) References Cited

U.S. PATENT DOCUMENTS

| | | | |
|---|---|---|---|
| 7,298,720 B2* | 11/2007 | Yamada et al. | 370/331 |
| 7,546,456 B2* | 6/2009 | Le et al. | 713/162 |
| 2003/0026230 A1* | 2/2003 | Ibanez et al. | 370/338 |
| 2003/0176188 A1* | 9/2003 | O'Neill | 455/433 |
| 2005/0101321 A1* | 5/2005 | Ikeda | H04W 8/065 455/435.1 |
| 2005/0237983 A1* | 10/2005 | Khalil et al. | 370/338 |
| 2005/0259626 A1* | 11/2005 | Devarapalli et al. | 370/338 |
| 2005/0271050 A1* | 12/2005 | Akgun et al. | 370/389 |
| 2007/0230453 A1* | 10/2007 | Giaretta | H04L 63/08 370/389 |

FOREIGN PATENT DOCUMENTS

| | | |
|---|---|---|
| JP | 2001103574 | 4/2001 |
| JP | 2003520535 A | 7/2003 |
| JP | 2003318943 | 11/2003 |
| JP | 2004147228 | 5/2004 |
| KR | 1020000062189 | 10/2000 |
| KR | 1020000076718 | 12/2000 |
| WO | WO0076249 | 12/2000 |
| WO | WO-0154437 A1 | 7/2001 |

OTHER PUBLICATIONS

Glass Sun Microsystems T Hiller Lucent Technologies S Jacobs GTE Laboratories C Perkins Nokia Research Center S: "Mobile IP Authentication, Authorization, and Accounting Requirements" UIETFS Tandard, Internet Engineering Task Force, I ETF, CH, Oct. 2000.

Hara, Kato, Ito, "Implementation of Mobile IP Protocol using FA Providing HA Functionality for MN-Initiated Traffic", Technical Report of IEICE, The Institute of Electronics, Information and Communication Engineers, Mar. 2004, pp. 131-136.

International Search Report and Written Opinion—PCT/US2005/023609, International Search Authority—European Patent Office—Oct. 18, 2005.

Johnson D: "Mobility Support in IPv6" IETF Standard-Workingdraft, Internet Engineering Task Force, IETF, CH, Jun. 30, 2003 (Jun. 30, 2003), XP015002681 ISSN: 0000-0004.

Narten et al.,"Privacy Extensions for Stateless Address Autoconfiguration in IPv6, Request for Comments: 3041", IETF Network Working Group, Category: Standards Track, Proposed Standard, Jan. 2001.

Taiwan Search Report—TW094122432—TIPO—Oct. 24, 2011.

European Search Report—EP12004529—Search Authority—Munich—Sep. 4, 2012.

Johnson et al., Mobility Support in IPv6', Network Working Group Request for Comments: 3775, Category: Standards Track, Internet Engineering Task Force (IETF), pp. 1-165, Jun. 2004 (Jun. 1, 2004), [retrieved on Jan. 10, 2013 (Jan. 10, 2013) from: http://tools.ietf.org/html/rfc3775].

* cited by examiner

DYNAMIC ASSIGNMENT OF HOME AGENT AND HOME ADDRESS IN WIRELESS COMMUNICATIONS

CLAIM OF PRIORITY UNDER 35 U.S.C. §119

This Application for Patent claims priority to Provisional Patent Application No. 60/585,532, entitled "Network Access Identifier (NAI) and Method Therefor," filed Jul. 1, 2004, and Provisional Patent Application No. 60/585,269, entitled "MIPv6 With Dynamic Home Address," filed Jul. 2, 2004, all of which are assigned to the Assignee hereof and hereby expressly incorporated by reference herein.

BACKGROUND

Field

This disclosure relates generally to wireless communications and mobile IP. More specifically, embodiments disclosed herein relate to providing dynamic assignment of home agent and home address for a mobile node.

Background

Mobile Internet Protocol (IP) is a recommended Internet protocol designed to support the mobility of a user. Such mobility becomes important because of the proliferation of laptop computers and hence the demand for continuous network connectivity anywhere the user happens to be.

The advance in wireless communications has also brought about a variety of wireless communication devices (e.g., personal digital assistants (PDAs), handhelds, mobile phones, etc.) capable of accessing the Internet and providing IP services, thus placing a greater demand on the current Internet infrastructure to provide mobile users with seamless connectivity and robust support.

DETAILED DESCRIPTION

Figure 1:
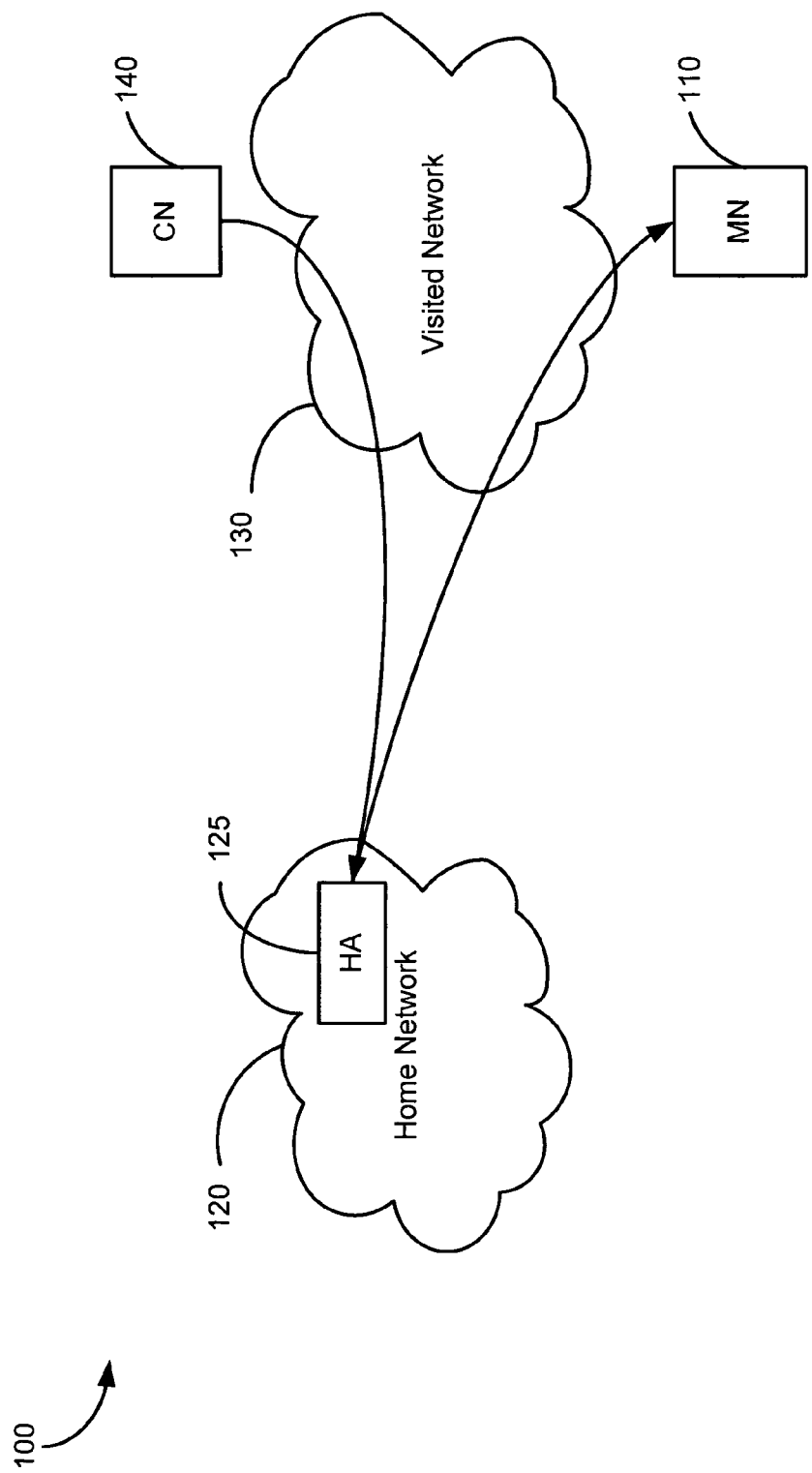
FIG. 1 illustrates a communication system configured to support MIPv6.

Embodiments disclosed herein relate to providing dynamic assignment of home agent and home address for a mobile node in wireless communications.

For reference and clarity, various acronyms and abbreviations used herein are summarized as follows:
AAA Authentication, Authorization, and Accounting
BA Binding Acknowledgement
BU Binding Update
CHAP Challenge-Handshake Authentication Protocol
CoA Care-of Address
DAD Duplicate Address Detection
DHCPv6 Dynamic Host Configuration Protocol version 6
EAP Extensible Authentication Protocol
HA Home Agent
HAAA Home AAA
HMAC Hashed Message Authentication Code
HoA Home Address
HoT Home Test
HoTI Home Test Init
IKE Internet Key Exchange
IPsec Internet Protocol security
IPv6 Internet Protocol version 6
IPv6CP IPv6 Control Protocol
ISAKMP Internet Security Association and Key Management Protocol
LCP Link Control Protocol
MIPv6 Mobile IP version 6
MN Mobile Node
MS-MPPE Microsoft Point-to-Point Encryption
NAI Network Access Identifier
NAS Network Access Server
NCP Network Control Protocol
PANA Protocol for carrying Authentication for Network Access
PEAPv2 Protected EAP Protocol version 2
PDSN Packet Data Service Node
PPP Point-to-Point Protocol
PRF Pseudo-Random Function
RADIUS Remote Authentication Dial In User Service
SA Security Association
SPD Security Policy Database
TLS Transport Layer Security
TTLS Tunneled TLS As used herein, a "node" may refer to a device configured to implement IP. A "link" may refer to a communication facility or medium over which nodes may communicate at the link layer. An "interface" may refer to a node's attachment to a link. A "subnet prefix" may refer to a bit string including a number of initial bits of an IP address. A "router" may include a node configured to forward IP packets not explicitly addressed to itself. A "unicast routable IP address" may refer to an identifier mapped to a single interface such that a packet sent to it from another IP subnet is delivered to the interface as mapped.

A "mobile node" (MN) may refer to a node that may change its point of attachment from one link to another, while still being reachable via its home address. An MN may include various types of devices, including (but not limited to) a wired phone, a wireless phone, a cellular phone, a laptop computer, a wireless communication personal computer (PC) card, a personal digital assistant (PDA), an external or internal modem, etc. In various applications, an MN may have different names, such as access unit, access terminal, subscriber unit, mobile station, mobile device, mobile unit, mobile phone, mobile, remote station, remote terminal, remote unit, user device, user equipment, handheld device, etc.

A "home address" (HoA) may refer to a unicast routable IP address assigned to an MN for an extended period of time. A "home subnet prefix" may refer to the IP subnet prefix corresponding to an MN's HoA. A "home network" may refer to an IP network on which an MN's home subnet prefix is configured.

The term "movement" may refer to a change in an MN's point of attachment to the Internet such that it is no longer connected to the same network as it was previously. If an MN is not currently attached to its home network, the MN is said to be "away from home."

A "care-of address" (CoA) may refer to a unicast routable IP address assigned to an MN while being away from home and on a visited (or foreign) network; the subnet prefix of CoA is a foreign subnet prefix. A "foreign subnet prefix" may refer to any IP subnet prefix other than the MN's home subnet prefix. A "visited network" may be any network other than the MN's home network.

A "home agent" (HA) may refer to a router (or routing entity) with which the MN has registered its HoA and current CoA. An HA may be configured to intercept packets destined to the MN's HoA and forward them (e.g., by way of encapsulating and tunneling) to the MN's registered CoA. A "visitor home agent" (visitor HA) disclosed herein may refer to an HA on a visited network to which an MN is attached.

A "correspondent node" (CN) may include a peer node with which an MN is communicating. The CN may be either mobile or stationary.

The term "binding" may refer to the association of an HoA and a CoA for an MN, along with the remaining lifetime of that association. A Binding Update (BU) may be used by an MN to register the binding of its CoA with its HoA. A Binding Acknowledgement (BA) may be used to acknowledge receipt of a BU.

IP addresses make it possible to route packets from a source endpoint to a destination by allowing routers to forward packets from incoming network interfaces to outbound interfaces according to routing tables. The routing tables typically maintain the next-hop (outbound interface) information for each destination IP address, which carries with it information specifying the IP node's point attachment (e.g., network prefix). To maintain existing transport-layer connections as an MN moves from one place to another, it needs to keep its IP address the same. Correct delivery of packets to the MN's current point of attachment, however, depends on the network prefix contained in the MN's IP address, which changes at new points of attachment. In other words, to change the routing requires a new IP address associated with the new point of attachment.

Mobile IP (MIP) has been designed to solve this problem by allowing an MN to use two IP address: a static HoA and a CoA (e.g., see MIP version 6 (MIPv6) or MIP version 4 (MIPv4), promulgated by the Internet Engineering Task Force (IETF) in Request for Comments (RFC) 3775 or RFC 3344). The HoA is static and used, e.g., to identify an MN's home network and/or other connection information (such as TCP connections). The CoA changes at each new point of attachment and may be thought of as the MN's topologically significant address; the CoA includes the network prefix and thus identifies the MN's point of attachment with respect to the network topology. The HoA makes it appear that the MN is continually able to receive data on its home network, where an HA is designated for the MN. When the MN is away from home and attached to a visited network, the HA gets all the packets destined for the MN's HoA and arranges to deliver them to the MN's current point of attachment.

When being away from home, an MN acquires a CoA (e.g., from a router or agent advertisement) from a visited network in connection with its current point of attachment. The MN then registers its new CoA with its HA by performing a BU. To get a packet to the MN from its home network, the HA delivers the packet from the home network to the CoA. This involves modifying the packet, so the CoA appears as the destination IP address. When the packet arrives at the CoA, the reverse transformation is applied, so the packet once again appears to have the MN's HoA as the destination IP address.

As such, MIP allows an MN to move seamlessly from one network to another without changing its HoA, and continually receive data using this address regardless of the MN's current point of attachment to the Internet. As a result, the movement of the MN away from its home network is transparent to transport protocols, high-layer protocols and applications.

In MIPv6, the assignment of HA and HoA is static. While this is intended to avoid an MN using its IPsec SA to perform a BU on behalf of another MN with the same HA, such may lead to some desirable consequences, as described below.

By way of example, FIG. 1 illustrates a communication system 100, wherein an MN 110, having an HoA, is away from a home network 120 and attached to a visited network 130. MN 110 has acquired a CoA in connection with visited network 130, and registered the binding of its HoA and CoA with an HA 125 on home network 120.

In one example, home network 120 may be located, for example, in San Diego, Calif., while visited network 130 may be located, for example, in Tokyo, Japan. (In other examples, home network 120 and visited network 130 may be in the same country but different cities, or other configurations.) MN 110 may be in communication with a CN 140 (e.g., a local Internet service provider or a mobile device) via visited network 130. In this case, packets from CN 140 to MN 110 (e.g., both in Tokyo) may have to be first routed to HA 125 (e.g., in San Diego), which then forwards the packets (e.g., by way of satellite and/or underwater cable) to MN 110 via its CoA. In other words, when MN 110 is away from home, the current MIP provides remote access service via its home network, which may cause packet transmissions to be inefficient and/or unreliable in some situations, such as described above. It would be desirable for MN 110 to receive local access service from visited network 130, without going through home network 120 each time.

Embodiments described herein relate to providing dynamic assignment of HA and HoA for an MN in relation to its current point of attachment, such that the MN is allowed to receive local access service.

Figure 2:
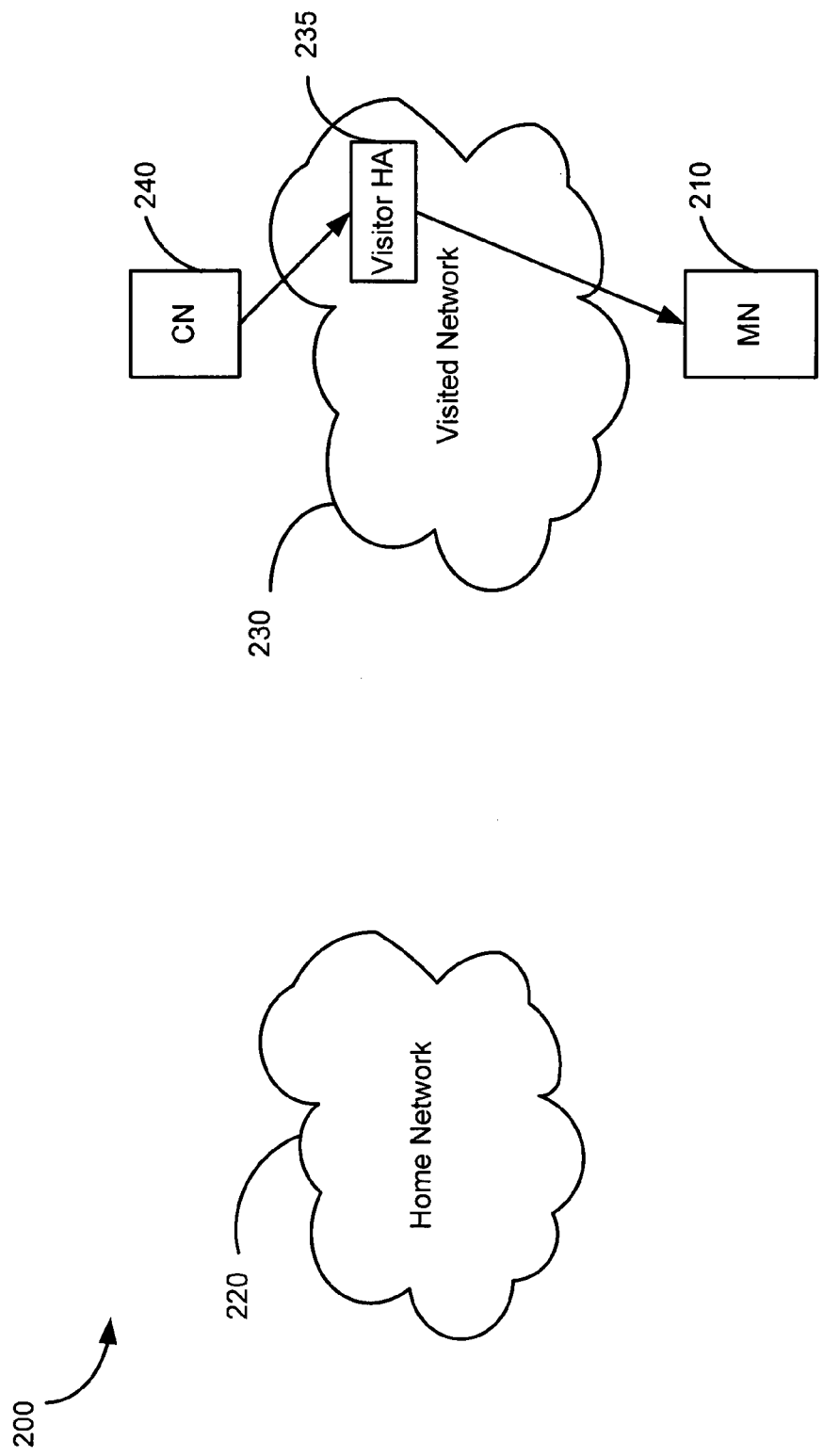
FIG. 2 illustrates a communication system, in which disclosed embodiments may be implemented.

FIG. 2 illustrates a communication system 200, in which various disclosed embodiments may be implemented. By way of example, an MN 210 is away from a home network 220 and attached to a visited network 230. A visitor HA 235 on visited network 230 and an HoA are assigned to MN 210. MN 210 may also acquire a CoA associated with visited network 230, and register the binding of its HoA and CoA with visitor HA 235 by performing a BU. In this way, MN 210 benefits from receiving local access service from visited network 230. For example, packets transmitted between MN 210 and a CN 240 may be routed via visitor HA 235 which is "local" (or proximate) to both MN 210 and CN 240, hence making packet transmissions more efficient and reliable. In some embodiments, the use or selection of visited network 230 by MN 210 and CN 240 may be based on, e.g., the locations of MN 210 and CN 240, the network loading status, or other conditions/criteria, etc.

Figure 3:
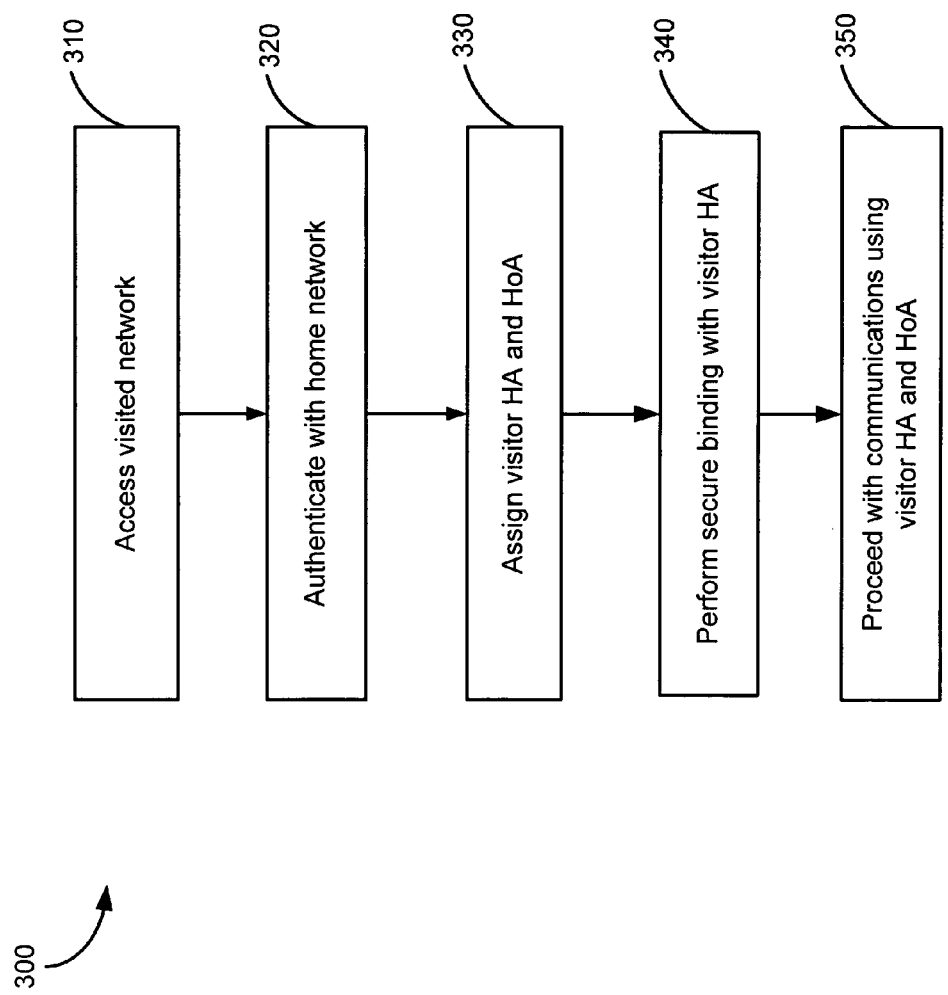
FIG. 3 illustrates an embodiment of procedures involved in dynamic assignment of HA and HoA.

FIG. 3 illustrates an embodiment 300 of procedures involved in dynamic assignment of HA and HoA for an MN (e.g., in communication system 200 of FIG. 2).

At step 310, an MN accesses a visited network (which may entail, e.g., configuring the data link and negotiating protocols for authentication with the visited network). At step 320, the visited network performs authentication with the MN's home network (e.g., a home AAA server in the home network). At step 330, the visited network assigns a visited HA and an HoA (or a portion of an HoA) for the MN. At step 340, the MN performs secure binding with the visitor HA (which may further include negotiating security association with the visitor HA). At step 350, the MN proceeds with communications using the visitor HA and HoA. Embodiments described below provide some examples.

Figure 4:
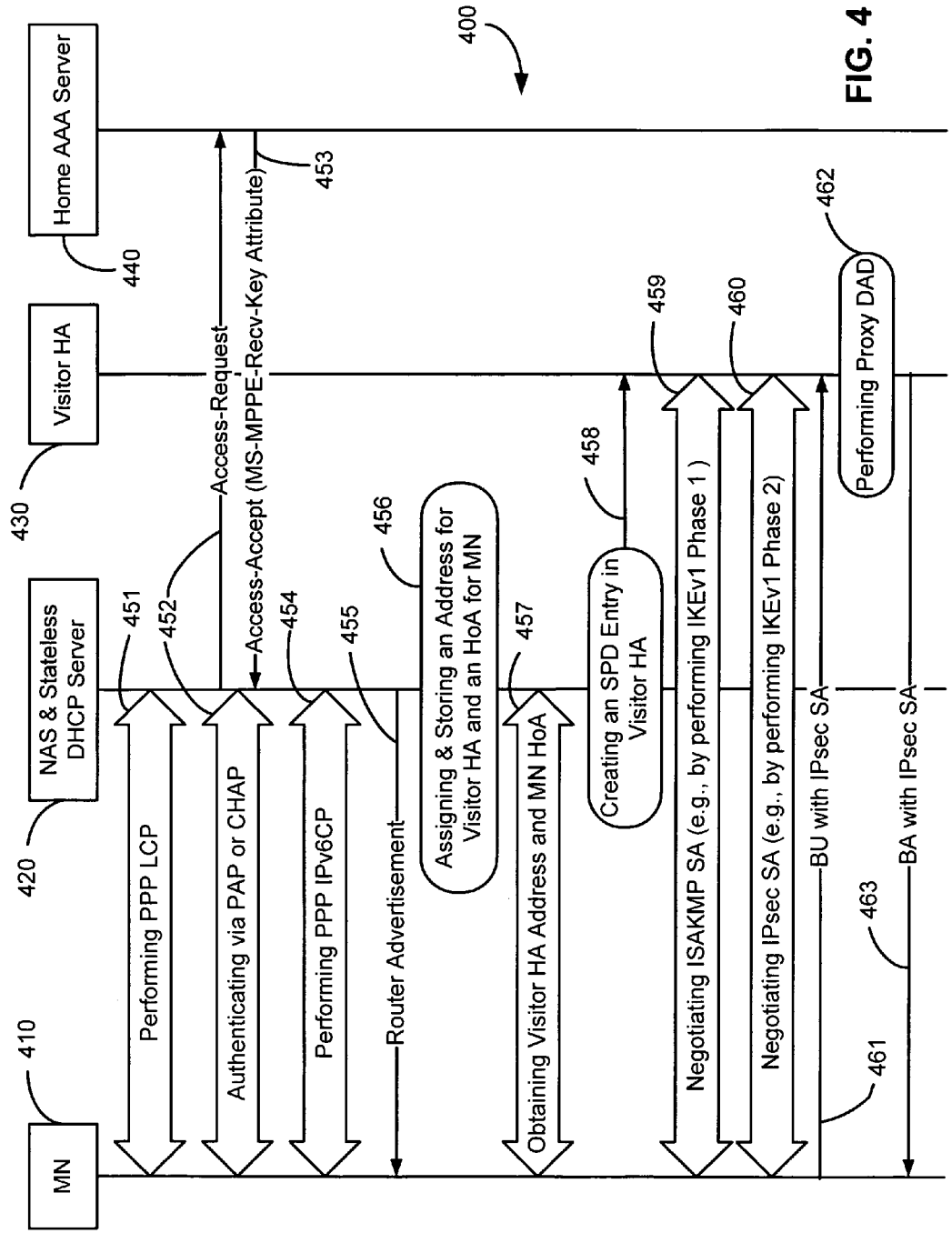
FIG. 4 illustrates a call flow diagram, which may be used in an embodiment to implement dynamic assignment of HA and HoA.

FIG. 4 illustrates a call flow diagram 400, which may be used in an embodiment to implement dynamic assignment of HA and HoA for an MN (e.g., in the embodiment of FIG. 3). By way of example, call flow diagram 400 illustrates negotiations taking place among an MN 410, a network access server (NAS) 420 on a visited network (not explicitly shown), and a home AAA server 440 on a home network (not explicitly shown), so as to assign a visitor HA 430 on the visited network and an HoA for MN 410. In one embodiment, NAS 420 may include a PSDN, working in conjunction with a stateless DHCP server, such as a stateless DHCPv6 server (e.g., as specified in IETF RFCs 3315 and 3736). Note, for simplicity and illustration, the stateless DHCP server is shown to be collocated with NAS 420. In other embodiments, they may be separately located.

At step 451, MN 410 configures the data link, e.g., by performing PPP LCP (such as specified in IETF RFC 1661), and negotiates the use of a protocol for authentication, such as PAP (e.g., as specified in IETF RFC 1661) or CHAP (e.g., as specified in IETF RFC 1994).

At step 452, MN 410 authenticates with NAS 420 via either PAP or CHAP. NAS 420 may authenticate MN 410 with home AAA server 440 via an access-request message specified by the RADIUS protocol (e.g., as specified in IETF RFCs 2865 and 3162). In other embodiments, the Diameter protocol (e.g., as specified in IETF RFC 3588) may also be used.

At step 453, home AAA server 440 authenticates MN 410 and responds to NAS 420 via an access-accept message specified by the RADIUS protocol. The access-accept message may include an MS-MPPE-Recv-Key vendor-specific attribute (e.g., as specified in IETF RFC 2548), containing MN 410's pre-shared key. The pre-shared key may be used during IKE/ISAKMP (e.g., as specified in IETF RFCs 2408 and 2409) by MN 410 and visitor HA 430 (e.g., see step 459 below). In the event that MN 420 authenticates with CHAP (such as described at step 451 above), MN 410's pre-shared key may be calculated as follows: PRF (MN-HAAA_Shared_Secret, CHAP_Challenge, NAI). The pseudo-random function (PRF) may be HMAC. The NAI may be MN 410's network access identifier. The "MN-HAAA_Shared_Secret" may be provisioned in both MN 410 and home AAA server 440 beforehand.

At step 454, MN 410 performs PPP IPv6CP (e.g., as specified in IETF RFC 2472) to negotiate a 64-bit interface ID, which MN 410 may use to configure its IPv6 link-local address (e.g., as specified in IETF RFCs 2460-2462 and 3513) and CoA (e.g., as specified in IETF RFC 3775) via stateless address autoconfiguration (e.g., as specified in IETF RFC 2462).

At step 455, NAS 420 sends a Router Advertisement message (e.g., as specified in IETF RFC 2461) to MN 410 containing a /64 prefix, which MN 410 may use to construct its CoA by appending the 64-bit interface ID negotiated at step 454 to the /64 prefix. In one embodiment, the Router Advertisement message may include "M-flag=0, O-flag=1, Router Lifetime, A-flag=1, L-flag=0" (e.g., as specified in IETF RFC 2461). The M-flag may be set to '0', indicating that MN 410 may use stateless address autoconfiguration to configure its CoA. The O-flag may be set to '1', indicating that MN 410 may use stateless DHCPv6 server to configure other parameters, including (but not limited to) visitor HA 430's address and MN 410's HoA, as further described below.

At step 456, NAS 420 assigns an address for visitor HA 430 and an HoA for MN 410. NAS 420 may store such information on the stateless DHCPv6 server.

At step 457, MN 410 uses the stateless DHCPv6 server to obtain the address for visitor HA 430 and the HoA for MN 410. In some embodiments, the address for visitor HA 430 and the HoA for MN 410 may be stored on the stateless DHCPv6 server as vendor-specific information options (such as specified in IETF RFC 3315).

At step 458, NAS 420 creates an SPD (such as specified in IETF RFC 2401) entry in visitor HA 430, e.g., for purposes of BU, BA, HoTI, HoT, and other messages (e.g., as specified in IETF RFC 3775). In some embodiments, NAS 420 may use the interface provided by the visitor HA 430 vendor to carry out such (e.g., as specified in IETF RFC 2570).

At step 459, MN 410 performs IKEv1 Phase 1 using aggressive mode with pre-shared key (e.g., as specified in IETF RFCs 2409 and 2460) with visitor HA 430, to negotiate ISAKMP SA and generate keys for IKEv1 Phase 2 ISAKMP messages.

At step 460, MN 410 performs IKEv1 Phase 2 using Quick mode (e.g., as specified in IETF RFCs 2409 and 2460) with visitor HA 430, to negotiate IPsec (e.g., as specified in IETF RFC 2401) SA and generate keys for non-ISAKMP messages to secure BU, BA, HoTI, HoT, and other messages (e.g., as specified in IETF RFC 3775).

At step 461, MN 410 registers the binding of its HoA and CoA with visitor HA 430 by performing a BU. Such may be protected by IPsec (e.g., see step 460 above).

At step 462, visitor HA 430 performs a proxy DAD (e.g., as specified in IETF RFCs 2462 and 3775) on behalf of MN 410, to ensure that no other node on visitor HA 430's link is using MN 410's HoA.

At step 463, MN 410 receives a BA from visitor HA 430 in response to its BU at step 461. Such may also be protected by IPsec (e.g., see step 460 above).

Figure 5:
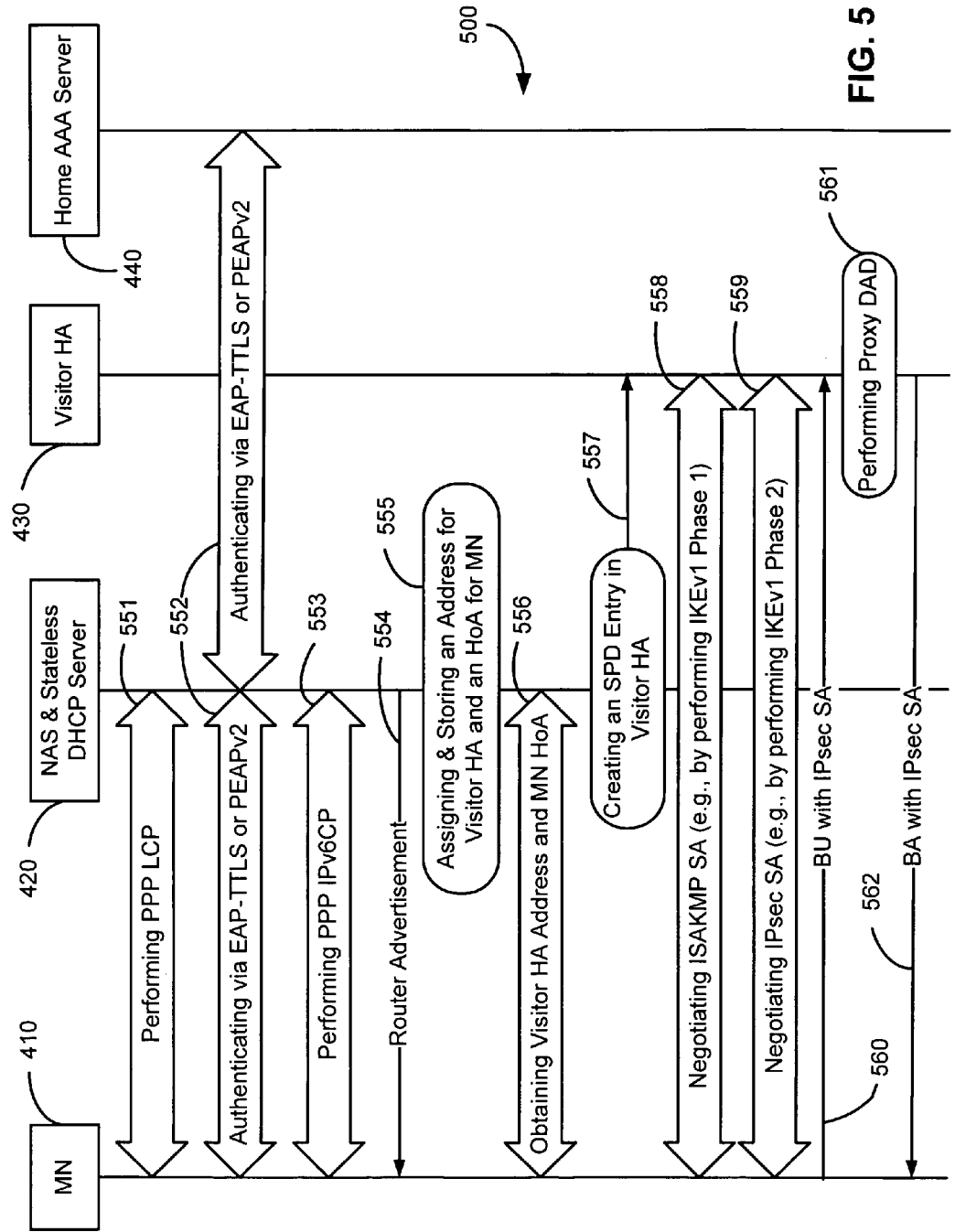
FIG. 5 illustrates a call flow diagram, which may be used in an embodiment to implement dynamic assignment of HA and HoA.

FIG. 5 illustrates a call flow diagram 500, which may be used in an embodiment to implement dynamic assignment of HA and HoA for an MN. For illustration and clarity, like elements are labeled with like numerals in FIGS. 4 and 5. Call flow diagram 500 may also share some of the features used in call flow diagram 400 of FIG. 4, as further described below.

At step 551, MN 410 performs PPP LCP (such as specified in IETF RFC 1661) to configure the data link and negotiate the use of EAP (e.g., as specified in IETF RFC 3487) for authentication.

At step 552, MN 410 authenticates with home AAA server 440 via either EAP-TTLS (e.g., as specified in "EAP Tunneled TLS Authentication Protocol (EAP-TTLS)," IETF draft, July 2004), or PEAPv2 (e.g., as specified in "Protected EAP Protocol (PEAP) Version 2," IETF draft, October 2004). The EAP communication between MN 410 and Home AAA server 440 may occur over PPP between MN 410 and NAS 420, and over the RADIUS protocol (such as specified in IETF RFC 2865) between NAS 420 and home AAA server 440. In other embodiments, the Diameter protocol (such as specified in IETF RFC 3588) may be used between NAS 420 and home AAA server 440. As part of this overall procedure, NAS 420 sends an access-request message (e.g., specified by the RADIUS protocol) to home AAA server 440, so as to obtain MN 410's pre-shared key (e.g., to be used during IKE/ISAKMP by MN 410 and visitor HA 430 below) and the keying material for encryption and authentication of data between MN 410 and NAS 420 (as part of EAP-TTLS or PEAPv2 functionality). Home AAA server 440 responds to NAS 420 with an access-accept message (e.g., specified by the RADIUS protocol). The access-accept message includes an MS-MPPE-Recv-Key vendor-specific attribute (e.g., as specified in IETF RFC 2548), which contains MN 410's pre-shared key.

At step 553, MN 410 performs PPP IPv6CP (e.g., as specified in IETF RFC 2472) to negotiate a 64-bit interface ID, which MN 410 may use to configure its IPv6 link-local address (e.g., as specified in IETF RFC 2460) and CoA (such as specified in IETF RFC 3775) via stateless address autoconfiguration (such as specified in IETF RFC 2462).

At step 554, NAS 420 sends a Router Advertisement (e.g., as specified in IETF RFC 2461) to MN 410 containing a /64 prefix, which MN 410 may use to construct its CoA by appending the 64-bit interface ID negotiated at step 553 above to the /64 prefix.

In one embodiment, the router advertisement may include "M-flag=0, O-flag=1, Router Lifetime, A-flag=1, L-flag=0" (e.g., as specified in IETF RFC 2461). The M-flag may be set to '0', indicating that MN 410 may use stateless address autoconfiguration to configure its CoA. The O-flag may be set to '1', indicating that MN 410 may use the stateless DHCPv6 server to configure other parameters, including (but not limited to) visitor HA 430's address and MN 410's HoA, as further described below.

At step 555, NAS 420 assigns an address for visitor HA 430 and an HoA for MN 410. NAS 420 may store such information on the stateless DHCPv6 server.

At step 556, MN 410 uses stateless DHCPv6 server to obtain the address for visitor HA 430 and its HoA. In some embodiments, the address for visitor HA 430 and HoA for MN 410 may be stored in the stateless DHCPv6 server as vendor-specific information options (such as specified in IETF RFC 3315).

At step 557, NAS 420 creates an SPD entry in visitor HA 430, e.g., for purposes of BU, BA, HoTI, HoT, and other messages (e.g., as specified in IETF RFC 3775). In some embodiments, NAS 420 may use the interface provided by the visitor HA 430 vendor to carry out such (e.g., as specified in IETF RFC 2570).

At step 558, MN 410 performs IKEv1 Phase 1 using aggressive mode with pre-shared key (e.g., as specified in IETF RFCs 2409 and 2460) with visitor HA 430, to negotiate an ISAKMP SA and generate keys for IKEv1 Phase 2 ISAKMP messages.

At step 559, MN 410 performs IKEv1 Phase 2 using Quick mode (e.g., as specified in IETF RFCs 2409 and 2460) with visitor HA 430, to negotiate IPsec SA and generate keys for non-ISAKMP messages to secure BU, BA, HoTI, HoT, and other messages (e.g., as specified in IETF RFC 3775).

At step 560, MN 410 registers the binding of its HoA and CoA with visitor HA 430 by performing a BU. Such may be protected by IPsec (e.g., see step 559 above).

At step 561, visitor HA 430 performs a proxy DAD (e.g., as specified in IETF RFCs 2462 and 3775) on behalf of MN 410, to ensure that no other node on visitor HA 430's link is using MN 410's HoA.

At step 562, MN 410 receives a BA from visitor HA 430 in response to its BU at step 560. Such may also be protected by IPsec (e.g., see step 560 above).

Figure 6:
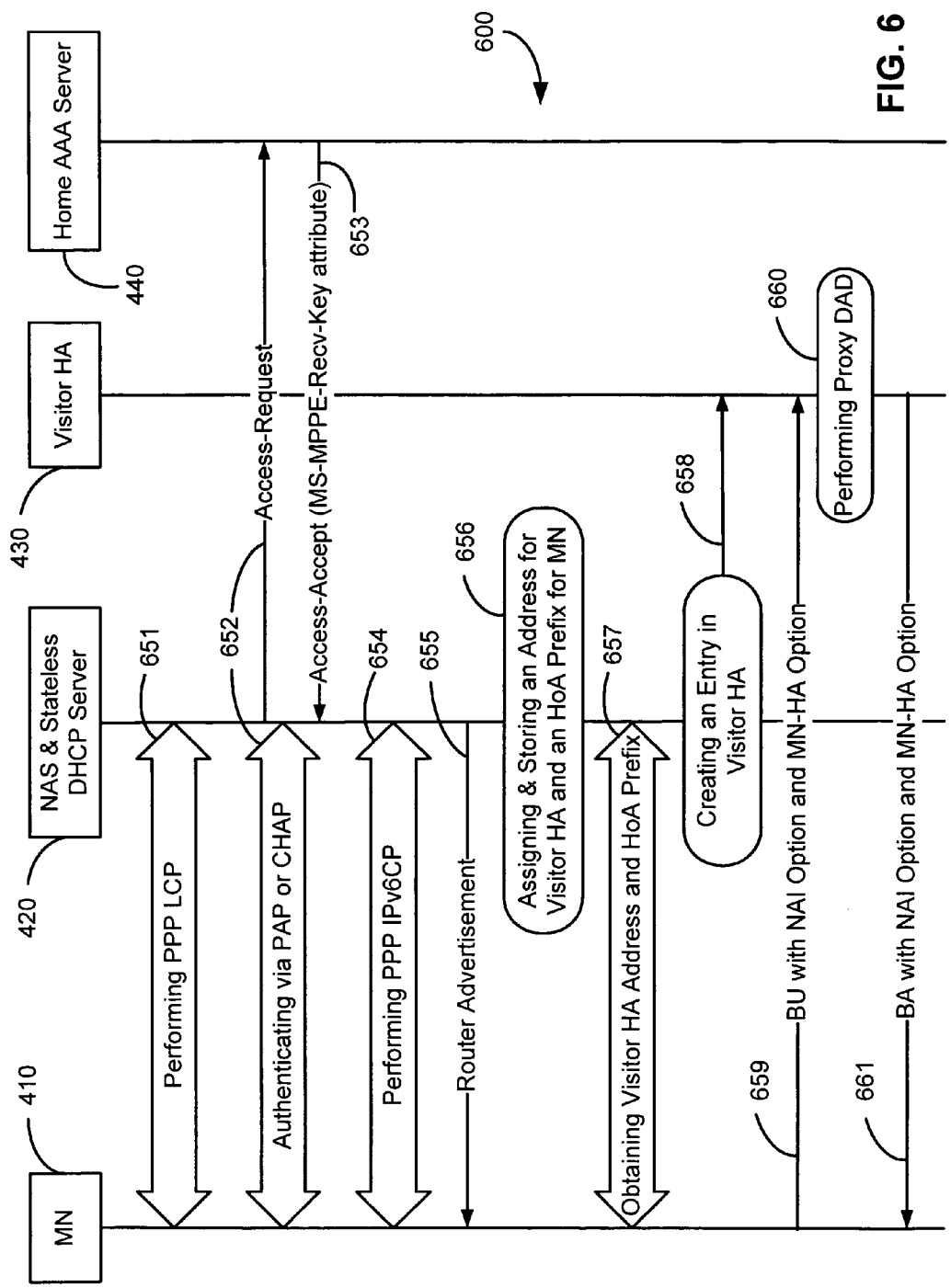
FIG. 6 illustrates a call flow diagram, which may be used in an embodiment to implement dynamic assignment of HA and HoA.

FIG. 6 illustrates a call flow diagram 600, which may be used in an embodiment to implement dynamic assignment of HA and HoA for an MN. For illustration and clarity, like elements are labeled with like numerals in FIGS. 4, 5, and 6. Call flow diagram 600 may also share some of the features used in call flow diagrams 400 and 500, as further described below.

At step 651, MN 410 performs PPP LCP (such as specified in IETF RFC 1661) to configure the data link and negotiate the use of either PAP (such as specified in IETF RFC 1661) or CHAP (such as specified in IETF RFC 1994) for authentication.

At step 652, MN 410 authenticates with NAS 420 via either PAP or CHAP. NAS 420 may authenticate MN 410 with home AAA server 440 via an access-request message specified by the RADIUS protocol (such as specified in IETF RFC 2865), or the Diameter protocol (such as specified in IETF RFC 3588), such as described above.

At step 653, home AAA server 440 authenticates MN 410 and responds to NAS 420 via an access-accept message specified by the RADIUS protocol. The access-accept message may include an MS-MPPE-Recv-Key vendor-specific attribute (e.g., as specified in IETF RFC 2548), containing MN 410's pre-shared key. The pre-shared key may be used during non-IPsec protected BU and BA by MN 410 and visitor HA 430, as further described below. In the event that MN 410 authenticates with CHAP (such as described at step 651 above), MN 410's pre-shared key may be calculated as follows: PRF (MN-HAAA_Shared_Secret, CHAP_Challenge, NAI). The pseudo-random function (PRF) may be HMAC. The NAI may be MN 410's network access identifier. The "MN-HAAA_Shared_Secret" may be provisioned in both MN 410 and home AAA server 440 beforehand.

In alternative embodiments, step 552 in call flow diagram 500 of FIG. 5 may be performed, e.g., in lieu of steps 652 and 653 above.

At step 654, MN 410 performs PPP IPv6CP (such as specified in IETF RFC 2472) to negotiate a 64-bit interface ID, which MN 410 may use to configure its IPv6 link-local address (such as specified in IETF RFC 2460) and CoA (such as specified in IETF RFC 3775) via stateless address autoconfiguration (such as specified in IETF RFC 2462).

At step 655, NAS 420 sends a Router Advertisement (e.g., as specified in IETF RFC 2461) to MN 410 containing a /64 prefix, which MN 410 may use to construct its CoA by appending the 64-bit interface ID negotiated at step 654 to the /64 prefix. In one embodiment, the router advertisement may include "M-flag=0, O-flag=1, Router Lifetime, A-flag=1, L-flag=0" (e.g., as specified in IETF RFC 2461). The M-flag may be set to '0', indicating that MN 410 may use stateless address autoconfiguration to configure its CoA. The O-flag may be set to '1', indicating that MN 410 may use the stateless DHCPv6 server to configure other parameters, including (but not limited to) visitor HA 430's address and MN 410's HoA, as further described below.

At step 656, NAS 420 selects an address for visitor HA 430 and a /64 HoA prefix for MN 410 (e.g., as specified in IETF RFC 3775). NAS 420 may store such information in the stateless DHCPv6 server.

At step 657, MN 410 uses the stateless DHCPv6 server to obtain the address for visitor HA 430 and the /64 HoA prefix. In some embodiments, the address for visitor HA 430 and the /64 HoA prefix may be stored in the stateless DHCPv6 server as vendor-specific information options (such as specified in IETF RFC 3315). Subsequently, MN 410 dynamically creates its HoA using the /64 HoA prefix and its 64-bit interface ID (negotiated at step 655 above). Note, in contrast to being assigned an HoA as in the embodiment of FIG. 4 or 5 above, MN 410 dynamically constructs its HoA in this case.

At step 658, NAS 420 creates an entry, which may include MN 410's NAI (such as specified in IETF RFC 2486) and pre-shared key, in visitor HA 430 for non-IPsec protected BU and BA messages (e.g., as specified in "Authentication for Mobile IPv6," IETF draft, January 2005, and "Mobile Node Identifier Option for Mobile IPv6," IETF draft, December 2004). NAS 420 may use the interface provided by the visitor HA 430 vendor to carry out such (e.g., as specified in IETF RFC 2570).

At step 659, MN 410 registers the binding of its HoA and CoA with visitor HA 430 by performing a BU. As mentioned above, this BU may not be not protected by IPsec. It may instead be protected by the MN-HA authentication mobility option (such as specified in "Authentication for Mobile IPv6," IETF draft, January 2005) and the NAI mobility option (such as specified in "Mobile Node Identifier Option for Mobile IPv6," IETF draft, December 2004). Visitor HA 430 may check its cache (e.g., populated by NAS 420) to ensure that the HoA being registered by MN 410 is not already in use (e.g., by another MN). Upon confirming such, the MN's registration may be permitted.

At step 660, visitor HA 430 performs a proxy DAD (e.g., as specified in IETF RFCs 2462 and 3775) on behalf of MN 410, to ensure that no other node on visitor HA 330's link is using MN 410's HoA.

At step 661, MN 410 receives a BA from visitor HA 430 in response to its BU at step 659. As mentioned above, this BA may not be protected by IPsec. It may instead be protected by the MN-HA authentication mobility option (such as specified in "Authentication for Mobile IPv6," IETF draft, January 2005) and the NAI mobility option (such as specified in "Mobile Node Identifier Option for Mobile IPv6," IETF draft, December 2004).

Embodiments disclosed herein (such as described above in FIGS. 2-5) provide some embodiments of dynamic assignment of HA and HoA for an MN. There are other embodiments and implementations. In alternative embodiments, for example, various procedures (e.g., data link configuration, authentication, configuring HoA and CoA, negotiating security association, etc.) described above may be performed in accordance with other suitable protocols. Further, for stateless address autoconfiguration specified in IETF RFCs 2462 and 2461, the subnet prefix for HoA is /64, such as described above. In other embodiments, the subnet prefix for HoA may be of different lengths (or forms).

Figure 7:
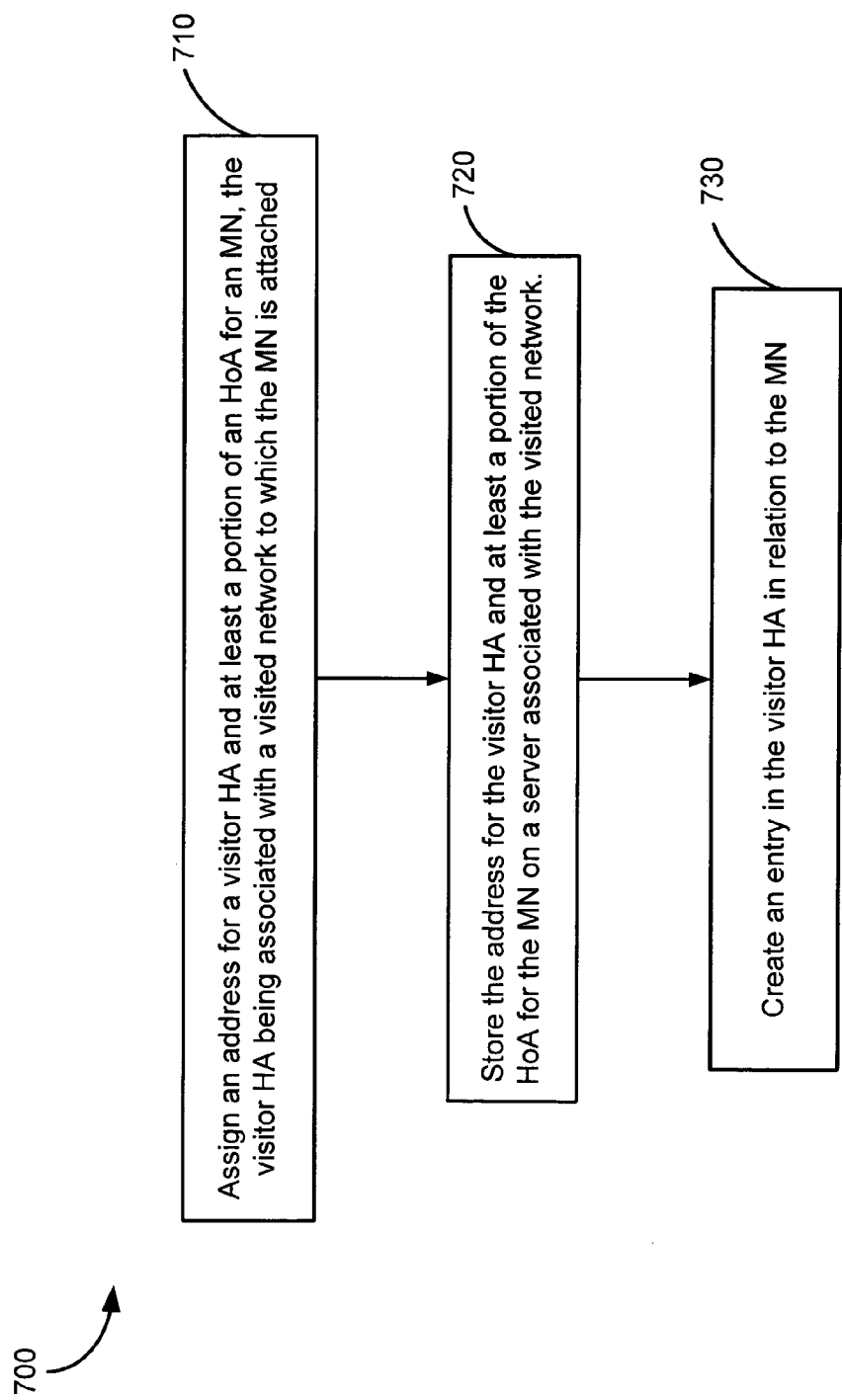
FIG. 7 illustrates a flow diagram of a process, which may be used in an embodiment to provide dynamic assignment of HA and HoA.

FIG. 7 illustrates a flow diagram of a process 700, which may be used in an embodiment to provide dynamic assignment of HA and HoA for an MN. Step 710 assigns an address for a visitor HA and at least a portion of an HoA for an MN, the visitor HA being associated with a visited network to which the MN is attached. The term "at least of a portion of an HoA" may include an HoA (such as in the embodiments of FIGS. 4-5 above), an HoA prefix (such as in the embodiment of FIG. 6 above), or other information associated with an HoA for the MN. Step 720 stores the address for the visitor HA and at least a portion of the HoA for the MN on a server (e.g., a stateless DHCPv6 server) associated with the visited network. Step 730 creates an entry in the visitor HA in relation to the MN. In one embodiment, the entry may be associated with an SPD entry for storing BU, BA, and other messages. In other embodiments, the entry may include an NAI and a pre-shared key associated with the MN.

Process 700 may further include performing authentication with the MN's home network (e.g., a home AAA server), e.g., to obtain a pre-shared key associated with the MN. Process 700 may also include transmitting a Router Advertisement to the MN, based on which the MN may configure a CoA.

Figure 8:
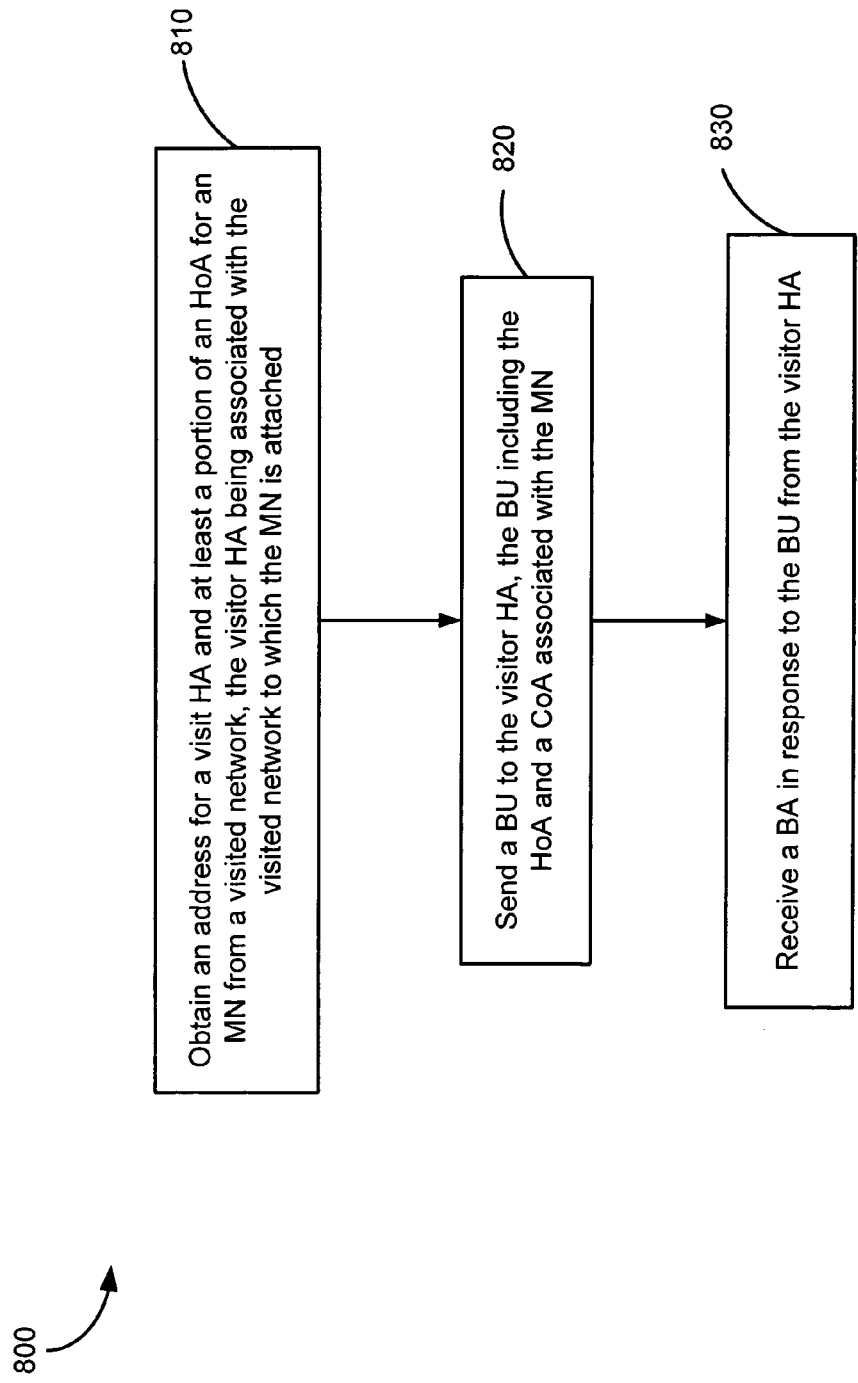
FIG. 8 illustrates a flow diagram of a process, which may be used in an embodiment to provide dynamic assignment of HA and HoA.

FIG. 8 illustrates a flow diagram of a process 800, which may be used in an embodiment to provide dynamic assignment of HA and HoA for an MN. Step 810 obtains an address for a visitor HA and at least a portion of an HoA for an MN from a visited network, the visitor HA being associated with the visited network to which the MN is attached. Step 820 sends a BU to the visitor HA, the BU including the HoA and a CoA associated with the MN. Step 830 receives a BA from the visitor HA in response to the BU.

Process 800 may further include configuring the CoA, e.g., based in part on a Router Advertisement received from the visited network. Process 800 may also include configuring the HoA, based in part on the portion of the HoA (e.g., an HoA prefix) obtained from the visited network. Process 800 may also include negotiating security association (e.g., IPsec) with the visitor HA.

Figure 9:
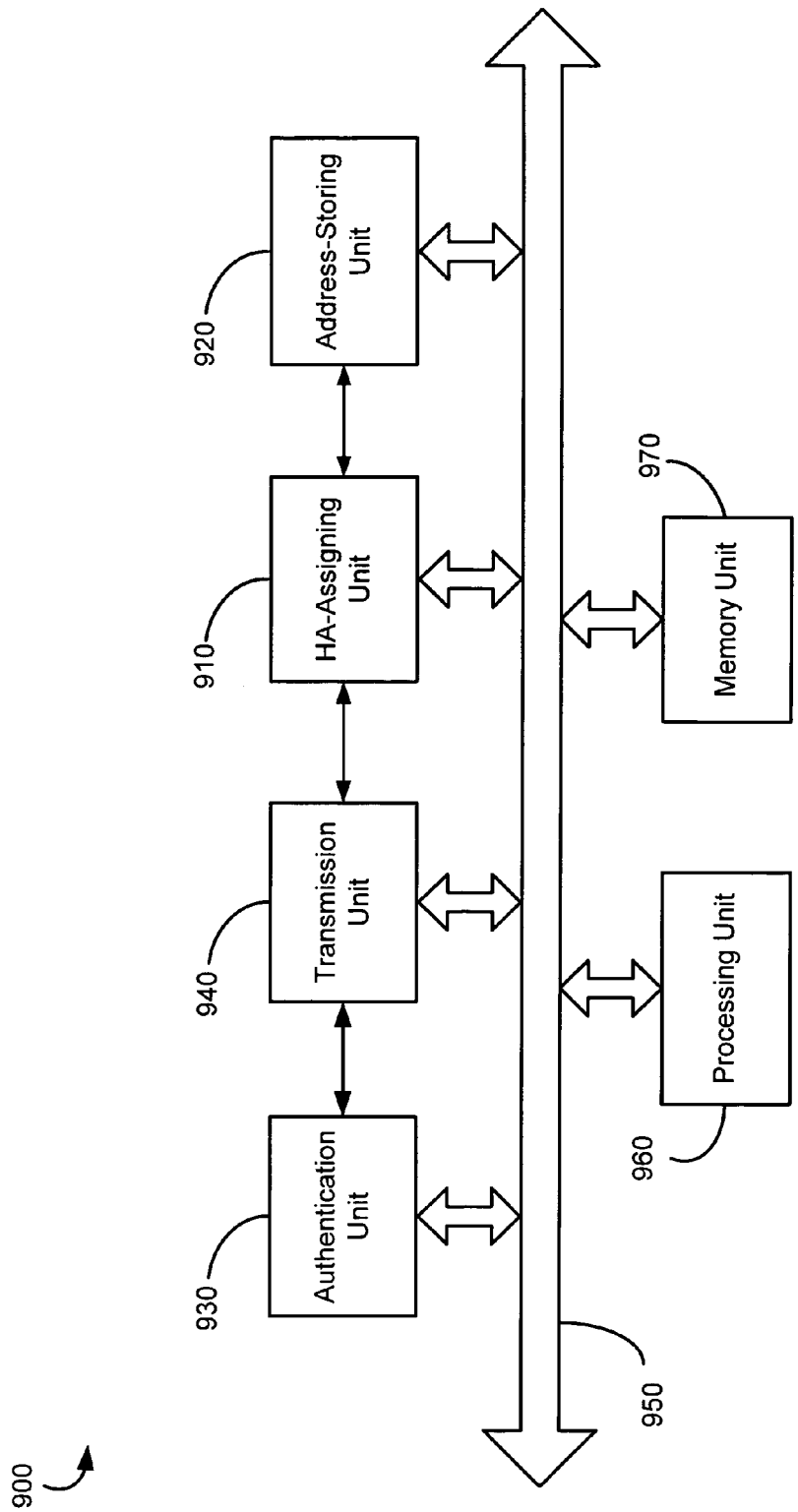
FIG. 9 illustrates a block diagram of an apparatus, in which some disclosed embodiments may be implemented.

FIG. 9 illustrates a block diagram of an apparatus 900, which may be used to implement some disclosed embodiments (such as described above). By way of example, apparatus 900 may include an HA-assigning unit (or module) 910 configured to assign an address for a visitor HA and at least a portion of an HoA for an MN, wherein the visitor HA is associated with a visited network to which the MN is attached; and an address-storing unit 920 configured to store the address for the visitor HA and at least a portion of the HoA for the MN. In some embodiments, the address-storing unit 920 may be associated with a server (e.g., a stateless DHCPv6 server) in the visited network. Apparatus 900 may further include an authentication unit 930 configured to perform authentication with the MN's home network (e.g., a home AAA). Apparatus 900 may also include a transmission unit 940 configured to transmit a Router Advertisement.

In apparatus 900, HA-assigning unit 910, address-storing unit 920, authentication unit 930, and transmission unit 940 may be coupled to a communication bus 950. A processing unit 960 and a memory unit 970 may also be coupled to communication bus 950. Processing unit 960 may be configured to control and/or coordinate the operations of various units. Memory unit 970 may embody instructions, e.g., to be executed by processing unit 960.

In some embodiments, apparatus 900 may be implemented in an NAS, or other network infrastructure means.

Figure 10:
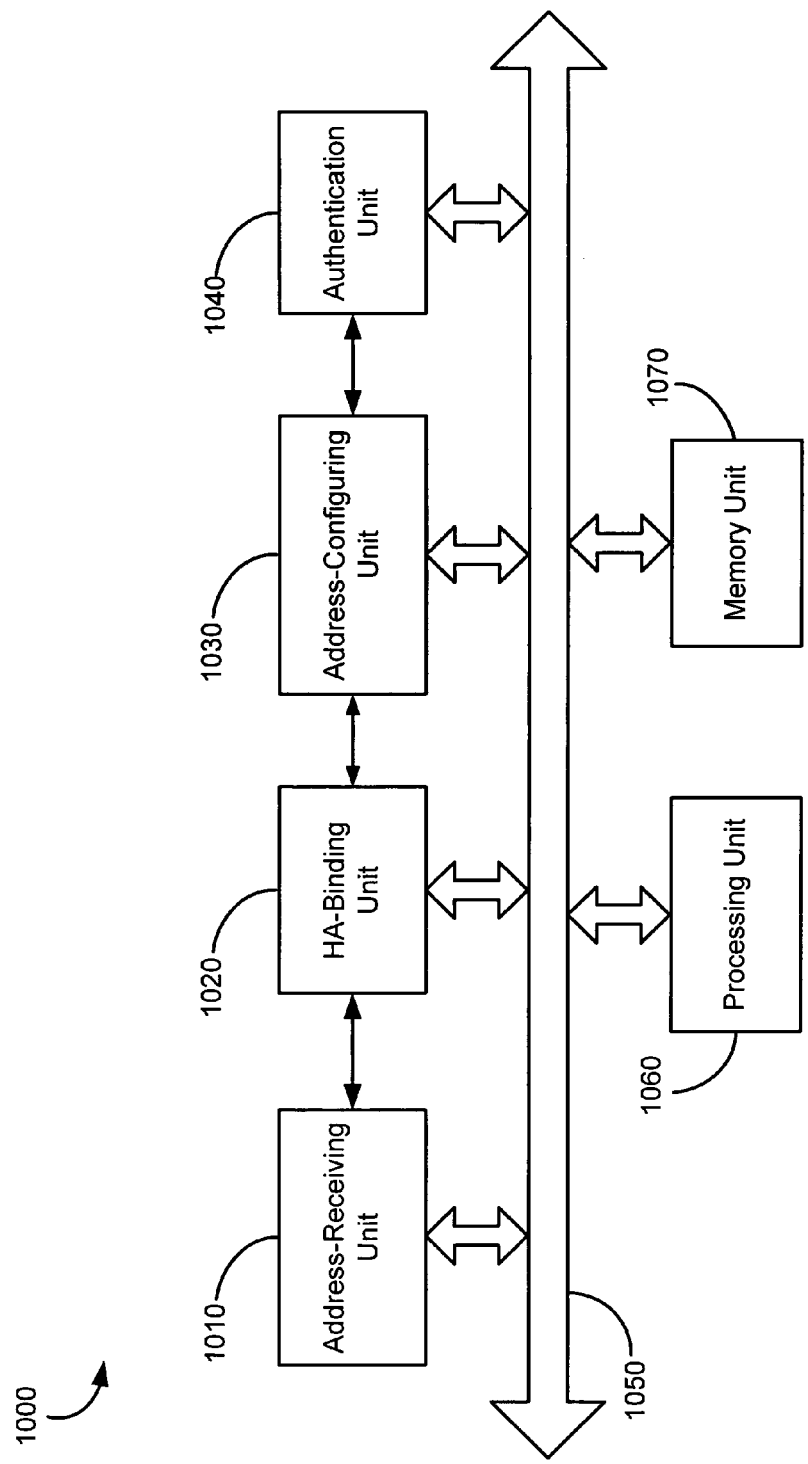
FIG. 10 illustrates a block diagram of an apparatus, in which some disclosed embodiments may be implemented.

FIG. 10 illustrates a block diagram of an apparatus 1000, which may be used to implements some disclosed embodiments (such as described above). By way of example, apparatus 1000 may include an address-receiving unit (or module) 1010 configured to obtaining an address for a visit HA and at least a portion of an HoA for an MN from a visited network, where the visitor HA is associated with the visited network to which the MN is attached; and an HA-binding unit 1020 configured to send a BU to the visitor HA, the BU including the HoA and a CoA associated with the MN. Apparatus 1000 may further include an address-configuration unit 1030 operative to configure the CoA, e.g., based in part on a Router Advertisement received from the visitor network. In some embodiments, address-configuration unit 1030 may also be operative to configure the HoA, based in part on the portion of the HoA (e.g., an HoA prefix) obtained from the visited network. Apparatus 1000 may also include an authentication unit 1040 configured to perform authentication with the visited network.

In apparatus 1000, address-receiving unit 1010, HA-binding unit 1020, address-configuration unit 1030, and authentication unit 1040 may be coupled to a communication bus 1050. A processing unit 1060 and a memory unit 1070 may also be coupled to communication bus 1050. Processing unit 1060 may be configured to control and/or coordinate the operations of various units. Memory unit 1070 may embody instructions, e.g., to be executed by processing unit 1060.

In some embodiments, apparatus 1000 may be implemented in an MN, or other data receiving means.

Various units/modules in FIGS. 9-10 and other embodiments may be implemented in hardware, software, firmware, or a combination thereof. In a hardware implementation, various units may be implemented within one or more application specific integrated circuits (ASIC), digital signal processors (DSP), digital signal processing devices (DSPDs), field programmable gate arrays (FPGA), processors, microprocessors, controllers, microcontrollers, programmable logic devices (PLD), other electronic units, or any combination thereof. In a software implementation, various units may be implemented with modules (e.g., procedures, functions, and so on) that perform the functions described herein. The software codes may be stored in a memory unit and executed by a processor (e.g., a processor unit). The memory unit may be implemented within the processor or external to the processor, in which case it may be communicatively coupled to the processor via various means known in the art.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in random access memory (RAM), flash memory, read only memory (ROM), electrically programmable ROM (EPROM), electrically erasable programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in an MN. In the alternative, the processor and the storage medium may reside as discrete components in an MN.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for wireless communications, comprising:
assigning, at a visited network, an address for a visitor home agent, wherein the visitor home agent is associated with the visited network to which a mobile node is attached;
assigning, at the visited network, at least a prefix portion of a home address for the mobile node;
creating the home address for the mobile node by combining the prefix portion of the home address with an interface identifier, wherein the interface identifier is negotiated between the mobile node and a network access server in the visited network;
receiving, at the visited network, a binding update from the mobile node, wherein the binding update includes the home address and a care-of address associated with the mobile node; and
proceeding with communication using the visitor home agent and the home address, wherein proceeding with the communication includes routing packets, by the visitor home agent using the home address and the care-of address, between the mobile node and a correspondent node without accessing a home agent associated with a home network of the mobile node.

2. The method of claim 1, further comprising storing, at the visited network, the address for the visitor home agent and the prefix portion of the home address for the mobile node on a server associated with the visited network.

3. The method of claim 1, further comprising performing, at the visited network, an authentication with the home network associated with the mobile node.

4. The method of claim 1, further comprising transmitting, from the visited network, a Router Advertisement providing information for the mobile node to configure the care-of address.

5. The method of claim 1, further comprising creating, at the visited network, an entry in the visitor home agent in relation to the mobile node.

6. A method for wireless communications, comprising:
obtaining, at a mobile node, an address for a visitor home agent, and at least a prefix portion of a home address for the mobile node assigned by a visited network, from the visited network, wherein the visitor home agent is associated with the visited network to which the mobile node is attached;
creating the home address for the mobile node by combining the prefix portion of the home address with an interface identifier, wherein the interface identifier is negotiated between the mobile node and a network access server in the visited network; and
sending, from the mobile node, a binding update to the visitor home agent, wherein the binding update includes the home address and a care-of address associated with the mobile node,
wherein the home address and the care-of address is to be used by the visitor home agent to route packets between the mobile node and a correspondent node without accessing a home agent associated with a home network of the mobile node.

7. The method of claim 6, further comprising receiving, at the mobile node, a binding acknowledgment from the visitor home agent in response to the binding update.

8. The method of claim 6, further comprising configuring, at the mobile node, the care-of address based in part on a Router Advertisement received from the visited network.

9. The method of claim 6, further comprising negotiating, at the mobile node, a security association with the visitor home agent.

10. The method of claim 6, further comprising performing, at the mobile node, an authentication with the visited network.

11. An apparatus adapted for wireless communications, comprising:
a processor configured to:
assign, at a visited network, an address for a visitor home agent, wherein the visitor home agent is associated with a visited network to which a mobile node is attached;
assign, at the visited network, at least a prefix portion of a home address for the mobile node;
create the home address for the mobile node by combining the prefix portion of the home address with an interface identifier, wherein the interface identifier is negotiated between the mobile node and a network access server in the visited network;
receive, at the visited network, a binding update from the mobile node, wherein the binding update includes the home address and a care-of address associated with the mobile node; and
proceed with communication using the visitor home agent and the home address, wherein the processor is configured to route packets, via the visitor home agent using the home address and the care-of address, between the mobile node and a correspondent node without accessing a home agent associated with a home network of the mobile node.

12. The apparatus of claim 11, wherein the processor is further configured to store, at the visited network, the address for the visitor home agent and the prefix portion of the home address for the mobile node on a server associated with the visited network.

13. The apparatus of claim 12, wherein the server associated with the visited network includes a stateless dynamic host configuration protocol (DHCP) server.

14. The apparatus of claim 11, wherein the processor is further configured to perform, at the visited network, an authentication with the home network associated with the mobile node.

15. The apparatus of claim 11, wherein the processor is further configured to transmit, from the visited network, a Router Advertisement providing information for the mobile node to configure the care-of address.

16. The apparatus of claim 11, wherein the processor is further configured to create, at the visited network, an entry in the visitor home agent in relation to the mobile node.

17. A mobile node adapted for wireless communications, comprising:
a processor configured to:
obtain, at the mobile node, an address for a visitor home agent, and at least a prefix portion of a home address for the mobile node assigned by a visited network, from the visited network, wherein the visitor home agent is associated with the visited network to which the mobile node is attached;
create the home address for the mobile node by combining the prefix portion of the home address with an interface identifier, wherein the interface identifier is negotiated between the mobile node and a network access server in the visited network; and
send, from the mobile node, a binding update to the visitor home agent, wherein the binding update includes the home address and a care-of address associated with the mobile node,
wherein the home address and the care-of address is to be used by the visitor home agent to route packets between the mobile node and a correspondent node without accessing a home agent associated with a home network of the mobile node.

18. The mobile node of claim 17, wherein the processor is further configured to receive, at the mobile node, a binding acknowledgment from the visitor home agent in response to the binding update.

19. The mobile node of claim 17, wherein the processor is further configured to configure, at the mobile node, the care-of address based in part on a Router Advertisement received from the visited network.

20. The mobile node of claim 17, wherein the processor is further configured to negotiate, at the mobile node, a security association with the visitor home agent.

21. The mobile node of claim 17, wherein the processor is further configured to perform, at the mobile node, an authentication with the visited network.

22. An apparatus adapted for wireless communications, comprising:
a home agent-assigning unit configured to assign an address for a visitor home agent and at least a prefix portion of a home address for a mobile node, wherein the visitor home agent is associated with a visited network to which the mobile node is attached;
an address-storing unit configured to store the address for the visitor home agent and the prefix portion of the home address for the mobile node in the visited network, wherein the prefix portion of the home address is combined with an interface identifier to create the home address for the mobile node, and the interface identifier is negotiated between the mobile node and a network access server in the visited network; and a processing unit configured to receive a binding update from the mobile node and to proceed with communication using the visitor home agent and the home address, wherein the binding update includes the home address and a care-of address associated with the mobile node, wherein the processing unit is configured to route packets, via the visitor home agent using the home address and the care-of address, between the mobile node and a correspondent node without accessing a home agent associated with a home network of the mobile node, wherein the apparatus is associated with the visited network.

23. The apparatus of claim 22, further comprising an authentication unit configured to perform authentication with a home network associated with the mobile node.

24. The apparatus of claim 22, further comprising a transmission unit configured to transmit a Router Advertisement, wherein the Router Advertisement provides information for the mobile node to configure the care-of address.

25. The apparatus of claim 22, wherein the address-storing unit is associated with a stateless dynamic host configuration protocol (DHCP) server of the visited network.

26. A mobile node adapted for wireless communications, comprising:
an address-receiving unit configured to obtain an address for a visitor home agent, and at least a prefix portion of a home address for the mobile node assigned by a visited network, from the visited network, wherein:
the visitor home agent is associated with the visited network to which the mobile node is attached,
the prefix portion of the home address is combined with an interface identifier to create the home address for the mobile node, and
the interface identifier is negotiated between the mobile node and a network access server in the visited network; and
a home agent-binding unit configured to send a binding update to the visitor home agent, wherein the binding update includes the home address and a care-of address associated with the mobile node,
wherein the home address and the care-of address is to be used by the visitor home agent to route packets between the mobile node and a correspondent node without accessing a home agent associated with a home network of the mobile node.

27. The mobile node of claim 26, further comprising an address-configuration unit operative to configure the care-of address based in part on a Router Advertisement received from the visited network.

28. The mobile node of claim 27, wherein the address-configuration unit is further operative to configure the home address based in part on the prefix portion of the home address obtained from the visited network.

29. The mobile node of claim 26, further comprising an authentication unit configured to perform authentication with the visited network.

30. A method for wireless communications, comprising:
receiving, at a visitor home agent associated at a visited network, a binding update from a mobile node attached to the visited network, wherein the binding update includes:
a dynamically created home address having a home address prefix portion assigned by the visited network, and an interface identifier, wherein the interface identifier is negotiated between the mobile node and a network access server in the visited network to which the mobile node is attached; and
a care-of address associated with the mobile node;
performing, at the visitor home agent, a proxy duplicate address detection in relation to the dynamically created home address associated with the mobile node;
sending, from the visitor home agent, a binding acknowledgment to the mobile node in response to the binding update; and
routing packets, by the visitor home agent using the home address and the care-of address, between the mobile node and a correspondent node without accessing a home agent associated with a home network of the mobile node.

31. An apparatus adapted for wireless communications, comprising:
means for receiving, at a visitor home agent at a visited network, a binding update from a mobile node, the binding update including:
a dynamically created home address having a home address prefix portion assigned by the visited network, and an interface identifier, wherein the interface identifier is negotiated between the mobile node and a network access server in the visited network to which the mobile node is attached; and
a care-of address associated with the mobile node;
means for performing, at the visitor home agent, a proxy duplicate address detection in relation to the dynamically created home address associated with the mobile node;
means for sending, from the visitor home agent, a binding acknowledgment to the mobile node in response to the binding update; and
means for routing packets, by the visitor home agent using the home address and the care-of address, between the mobile node and a correspondent node without accessing a home agent associated with a home network of the mobile node,
wherein the apparatus is associated with the visited network.

32. A non-transitory computer-readable medium, comprising instructions stored thereon that, if executed by a processor, cause the processor to execute a method comprising:
assigning, at a visited network, an address for a visitor home agent, wherein the visitor home agent is associated with the visited network to which a mobile node is attached;
assigning, at the visited network, at least a prefix portion of a home address for the mobile node;
creating the home address for the mobile node by combining the prefix portion of the home address with an interface identifier, wherein the interface identifier is negotiated between the mobile node and a network access server in the visited network;
receiving, at the visited network, a binding update from the mobile node, wherein the binding update includes the home address and a care-of address associated with the mobile node; and
proceeding with communication using the visitor home agent and the home address, wherein proceeding with the communication includes routing packets, by the visitor home agent using the home address and the care-of address, between the mobile node and a correspondent node without accessing a home agent associated with a home network of the mobile node.

33. A non-transitory computer-readable medium, comprising instructions stored thereon that, if executed by a processor, cause the processor to execute a method comprising:
- obtaining, at a mobile node, an address for a visitor home agent, and at least a prefix portion of a home address for the mobile node assigned by a visited network, from the visited network, wherein the visitor home agent is associated with the visited network to which the mobile node is attached;
- creating the home address for the mobile node by combining the prefix portion of the home address with an interface identifier, wherein the interface identifier is negotiated between the mobile node and a network access server in the visited network; and
- sending, from the mobile node, a binding update to the visitor home agent, wherein the binding update includes the home address and a care-of address associated with the mobile node,
- wherein the home address and the care-of address is to be used by the visitor home agent to route packets between the mobile node and a correspondent node without accessing a home agent associated with a home network of the mobile node.

34. The method of claim 1, wherein the prefix portion is a sixty-four bit home address prefix.

35. The method of claim 6, wherein the prefix portion is a sixty-four bit home address prefix.

36. A mobile node adapted for wireless communications, comprising:
- means for obtaining, at the mobile node, an address for a visitor home agent, and at least a prefix portion of a home address for the mobile node assigned by a visited network, from the visited network, wherein the visitor home agent is associated with the visited network to which the mobile node is attached;
- means for creating the home address for the mobile node by combining the prefix portion of the home address with an interface identifier, wherein the interface identifier is negotiated between the mobile node and a network access server in the visited network; and
- means for sending a binding update to the visitor home agent, wherein the binding update includes the home address and a care-of address associated with the mobile node,
- wherein the home address and the care-of address is to be used by the visitor home agent to route packets between the mobile node and a correspondent node without accessing a home agent associated with a home network of the mobile node.

* * * * *